United States Patent
Fu et al.

(10) Patent No.: US 9,906,323 B2
(45) Date of Patent: Feb. 27, 2018

(54) METHOD AND DEVICE FOR MAPPING AND DEMAPPING DATA

(71) Applicant: ZTE Corporation, Shenzhen (CN)

(72) Inventors: Xihua Fu, Shenzhen (CN); Xinling Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 177 days.

(21) Appl. No.: 14/768,662

(22) PCT Filed: Feb. 13, 2014

(86) PCT No.: PCT/CN2014/072041
§ 371 (c)(1),
(2) Date: Aug. 18, 2015

(87) PCT Pub. No.: WO2014/124595
PCT Pub. Date: Aug. 21, 2014

(65) Prior Publication Data
US 2016/0006535 A1 Jan. 7, 2016

(30) Foreign Application Priority Data
Feb. 18, 2013 (CN) .......................... 2013 1 0052711

(51) Int. Cl.
*H04J 14/02* (2006.01)
*H04L 5/00* (2006.01)
*H04J 3/16* (2006.01)

(52) U.S. Cl.
CPC ........ *H04J 14/0239* (2013.01); *H04J 3/1652* (2013.01); *H04J 14/02* (2013.01); *H04L 5/0053* (2013.01); *H04J 14/0273* (2013.01)

(58) Field of Classification Search
None
See application file for complete search history.

(56) References Cited

U.S. PATENT DOCUMENTS

| 6,724,996 B1 | 4/2004 | Ballintine | |
|---|---|---|---|
| 2009/0169217 A1* | 7/2009 | Meagher | H04J 3/047 398/140 |

(Continued)

FOREIGN PATENT DOCUMENTS

| CN | 102511171 A | 6/2012 |
|---|---|---|
| CN | 102870434 A | 1/2013 |

OTHER PUBLICATIONS

International Search Report for corresponding application PCT/CN2014/072041 filed Feb. 13, 2014; dated May 28, 2014.

*Primary Examiner* — Charles C Jiang
*Assistant Examiner* — George Atkins, Jr.
(74) *Attorney, Agent, or Firm* — Cantor Colburn LLP

(57) ABSTRACT

Provided are a method and device for mapping and demapping of data. The method comprises: an OTUCnAG comprising an ODUCn with a rate of n*100 gigabits per second to which is added an OTU overhead, is divided according to a byte-interleaving scheme into multiple OTUCmTG; the OTUCmTG respectively are each mapped to a corresponding OCh, and data in the OCh is born on continuous frequency slots for transmission, wherein the rate of the OTUCnAG is n*100 gigabits per second, the rate of the OTUCmTG is m*100 gigabits per second, both m and n are positive integers, and m less than or equal to n. The disclosure increases optical fibre spectrum utilization efficiency and system flexibility and compatibility.

11 Claims, 10 Drawing Sheets

(56) References Cited

U.S. PATENT DOCUMENTS

| | | | | |
|---|---|---|---|---|
| 2011/0123196 A1* | 5/2011 | Ye | ............... | H04J 3/1652 |
| | | | | 398/66 |
| 2012/0163812 A1 | 6/2012 | Youn | | |
| 2015/0098703 A1* | 4/2015 | Wu | ............... | H04Q 11/00 |
| | | | | 398/66 |

\* cited by examiner

METHOD AND DEVICE FOR MAPPING AND DEMAPPING DATA

TECHNICAL FIELD

The disclosure relates to the field of communications, and in particular to a method and device for mapping and demapping data.

BACKGROUND

The development tendency of the optical transport technology presents the characteristics of a higher single-channel rate (for example, single-channel 400 G/1 T transport), a higher spectrum efficiency and a higher-order modulation format, so that it is still the most explicit and the most important direction of optical transport development to continue to improve the rate. The high-rate transport faces many restrictions, which are mainly in two aspects: on one hand, the optical transport technology develops towards high-spectrum efficiency convergence transport and high-rate service interface transport, and if the spectrum efficiency cannot be improved continuously, then it makes little sense to convergent from a low-rate to a high-rate and then perform transport; however, since there may still be a high-rate Ethernet interface at a client side, the problem of the transport of a high-rate interface still needs to be considered, and 400 G would be a critical point of the spectrum efficiency limit; on the other hand, the optical transmission technology develops towards a long distance (long span segment and multi-span segment), although the optical signal-noise ratio (OSNR) of a system can be improved by way of using low-loss optical fibre and a low-noise amplifier, reducing span segment spacing, etc., the improvement is limited and it is difficult to make a major breakthrough, and it is also difficult to be implemented in engineering.

With an increasing demand for the bandwidth of a bearing network, the beyond 100 G technology becomes a solution for meeting the growing demand for bandwidth; above 100 G, no matter 400 G or 1 T, the traditional wavelength division multiplexing (WDM) with a 50 GHz fixed grid cannot provide sufficient spectrum width to realize the beyond 100 G technology. Due to the defects of the fixed grids, the requirement for wider flexible grids is proposed.

In the related art, beyond 100 G multi-rate mixed transmission and beyond 100 G modulation code flexibility lead to different channel bandwidth demands, and if each channel is customized with an appropriate bandwidth, full use of the system bandwidths can be achieved, thereby generating a flexible grid system. On the basis of a demand for an ultra high-rate WDM system due to the continuously increasing of the bandwidth demand, a demand for the flexible grid technology is introduced. However, many problems, such as how to perform frequency spectrum planning and administration effectively and the compatibility with the existing systems, are to be resolved.

In view of the problem of how to map and multiplex data effectively after a flexible grid is introduce into the related art, no effective solution has been proposed so far.

SUMMARY

The embodiments of the disclosure provide a solution for mapping and demapping data, so as to at least solve the problem of how to map and multiplex data effectively after a flexible grid technology is introduced into the above-mentioned related art.

According to one aspect of the embodiments of the disclosure, a method for mapping data is provided, comprising: dividing an Optical Transmit Unit 4 n Administrative Group frame (OTUCnAG) which is formed after an Optical Transmit Unit (OTU) overhead is added to an Optical Data Unit 4 n frame (ODUCn) having a rate of n*100 Gbit/s into a plurality of Optical Transmit Unit Transport Group Frames (OTUCmTGs) in a byte-interleaving way; and mapping each of the OTUCmTGs into a corresponding Optical Channel (OCh) respectively, and bearing data in the OCh on continuous frequency slots for transmission, wherein a rate of the OTUCnAG is n*100 Gbit/s, and a rate of the OTUCmTG is m*100 Gbit/s, with both m and n being positive integers, and m <n.

Preferably, dividing the OTUCnAG into the plurality of OTUCmTGs in the byte-interleaving way comprises: dividing the OTUCnAG having the rate of n*100 Gbit/s into n Optical Transmit Unit subframes (OTUCs) having a rate of 100 Gbit/s; and grouping the n OTUCs having the rate of 100 Gbit/s into L OTUCmTGs having the same or different rates, wherein the content in the [n*(k−1)+i]th column byte area of the OTUCnAG having the rate of n*100 Gbit/s is taken as the content in the kth column byte area of the ith of the OTUCs having the rate of 100 Gbit/s, and the frame structure of the OTUC has four rows and 4080 columns, with n, i, k and L being all positive integers, and n>L, 1≤i≤n, 1≤k≤4080.

Preferably, an OTU overhead byte of each of the OTUCs carries at least one of the following: a serial number of the OTUC, and a serial number of the OTUCnAG to which the OTUC belongs.

Preferably, mapping each of the OTUCmTGs into the corresponding OCh respectively includes: distributing each of the OTUCmTGs on a plurality of electrical channel signals for transmission; and then mapping the plurality of electrical channel signals corresponding to the same OTUC-mTG into one of the OChs for transmission, wherein OChs corresponding to all of the OTUCmTGs in the same OTUC-nAG belong to the same OChAG.

According to another aspect of the embodiments of the disclosure, a method for demapping data, which has been processed according to the above-mentioned method for mapping data, is provided, and the method comprises: after all of the OTUCs having the same TTI or the same OTUC-nAG serial number is received completely according to TTI or OTUCnAG serial number in the OTU overhead bytes of the OTUCs, taking the content in the $k^{th}$ column byte area of each of the OTUCs as the content of the $[n*(k-1)+x]^{th}$ column byte area of the demapped OTUCnAG in an ascending order of the serial numbers of the OTUCnAGs to which the OTUCs belongs, where x is the serial number of the OTUC in the OTUCnAG, with x being an integer, and 1≤x≤n.

According to yet another aspect of the embodiments of the disclosure, a method for demapping data having been processed according to the above-mentioned method for mapping data is provided, and the method comprises: converting a received optical signal of each OCh in one of the OTUCnAGs into a plurality of groups of electrical channel signals respectively, wherein each group of the plurality of groups of electrical channel signals is converted into one of the OTUCs.

According to still another aspect of the embodiments of the disclosure, a sending node for sending an optical signal is further provided, and the method comprises: a mapping component which is configured to divide an OTUCnAG which is formed after an OTU overhead is added to an ODUCn having a rate of n*100 Gbit/s into a plurality of OTUCmTGs in a byte-interleaving way, wherein the rate of the OTUCnAG is n*100 Gbit/s, and a rate of the OTUCmTG is m*100 Gbit/s, with both m and n being positive integers, and m≤n; and a transmit component which is configured to map each of the OTUCmTGs into a corresponding optical channel (OCh) respectively, and bearing data in the OCh on continuous frequency slots for transmission.

Preferably, the mapping component comprises: a division element which is configured to divide the OTUCnAG having the rate of n*100 Gbit/s into n OTUCs having a rate of 100 Gbit/s, wherein the content in the [n*(k−1)+i]th column byte area of the OTUCnAG having the rate of n*100 Gbit/s is taken as the content in the kth column byte area of the ith of the OTUCs having the rate of 100 Gbit/s, and the frame structure of the OTUC has four rows and 4080 columns, with n, i, k and L being all positive integers, and n>L, 1≤i≤n, 1≤k≤4080; and a packet element which is configured to group the n OTUCs having the rate of 100 Gbit/s into L OTUCmTGs having the same or different rates.

Preferably, the transmit component comprises: a multiplexing element which is configured to distribute each of the OTUCmTGs on a plurality of electrical channel signals for transmission, and then map the plurality of electrical channel signals corresponding to the same OTUCmTG into one of the OChs for transmission, wherein OChs corresponding to all of the OTUCmTGs in the same OTUCnAG belong to the same OChAG.

According to another aspect of the embodiments of the disclosure, a receiving node for receiving an optical signal sent by the above-mentioned sending node is provided, and the receiving node comprises: a demapping component which is configured to take, after all of the OTUCs having the same TTI or the same OTUCnAG serial number are received completely according to TTIs or OTUCnAG serial numbers in the OTU overhead bytes of the OTUCs, the content in the $k^{th}$ column byte area of each of the OTUCs as the content of the $[n*(k-1)+x]^{th}$ column byte area of the demapped OTUCnAG in an ascending order of the serial numbers of the OTUCnAGs to which the OTUCs belongs, where x is the serial number of the OTUC in the OTUCnAG, with x being an integer, and 1≤x≤n.

According to yet another aspect of the embodiments of the disclosure, a receiving node for an optical signal sent by the above-mentioned sending node is provided, comprising: a demultiplexing component, which is configured to convert a received optical signal of each OCh in one of the OTUCnAGs into a plurality of groups of electrical channel signals respectively, wherein each group of the plurality of groups of electrical channel signals is converted into one of the OTUCs.

According to still another aspect of the embodiments of the disclosure, a transmit system for transmitting an optical signal is further provided, comprising the above-mentioned sending node and the above-mentioned receiving node.

According to the embodiments of the disclosure, by way of dividing an OTUCnAG which is formed after an OTU overhead is added to an ODUCn having a rate of n*100 Gbit/s into a plurality of OTUCmTGs in a byte-interleaving way; and mapping each of the OTUCmTGs into a corresponding OCh respectively, and bearing data in the OCh on continuous frequency slots for transmission, the problem of how to map and multiplex data effectively after the flexible grid technology is introduced into the related art is solved, so that the operators can deploy a beyond 100 G optical transmit system with more flexibility, thereby improving optical fibre spectrum utilization efficiency and system flexibility and compatibility.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF EMBODIMENTS

The disclosure is described below with reference to the accompanying drawings and embodiments in detail. It should be noted that the embodiments of the present application and the characteristics of the embodiments can be combined with each other if no conflict is caused.

Figure 1:
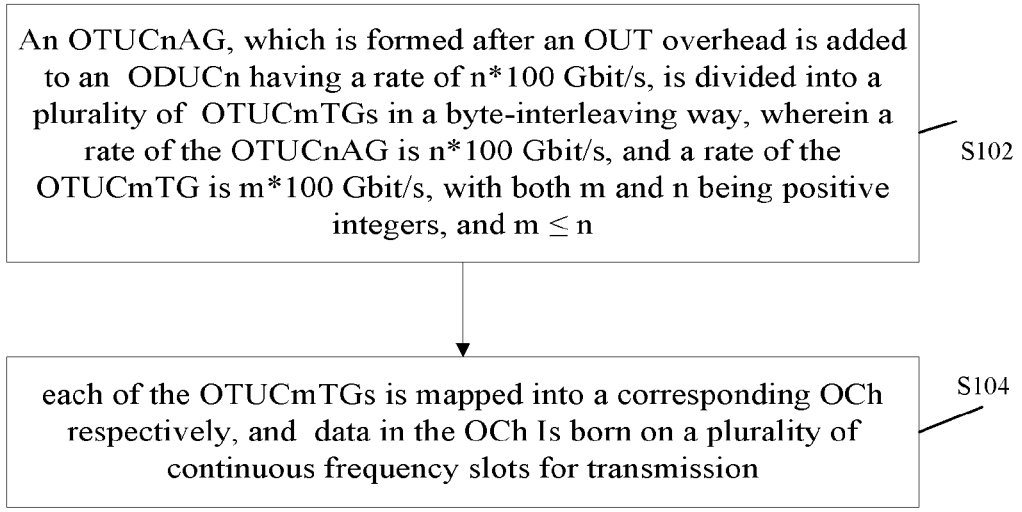
FIG. 1 is a flowchart of a method for mapping and multiplexing data according to an embodiment of the disclosure.

An embodiment of the disclosure provides a method for mapping data. FIG. 1 is a flowchart of a method for mapping and multiplexing data according to an embodiment of the disclosure, and as shown in FIG. 1, the method comprises the steps of:

step S102, dividing an Optical Transmit Unit Administrative Group frame (which can be denoted by OTUCnAG), which is formed after an Optical Transmit Unit (OTU) overhead is added to an Optical Data Unit frame (which can be denoted by ODUCn) having a rate of n*100 Gbit/s, into a plurality of Optical Transport Group frames (which can be denoted by OTUCmTG) in a byte-interleaving way, wherein a rate of the OTUCnAG is n*100 Gbit/s, and a rate of the OTUCmTG is m*100 Gbit/s, with both m and n being positive integers, and m≤n; and step S104, mapping each of the OTUCmTGs into a corresponding Optical Channel (OCh) respectively, and bearing data in the OCh on a plurality of continuous frequency slots for transmission.

According to the above-mentioned steps, by way of dividing an OTUCnAG, which is formed after the OTU overhead is added to the ODUCn having the rate of n*100 Gbit/s, into a plurality of OTUCmTGs in a byte-interleaving way; and mapping each of the OTUCmTGs into the corresponding OCh respectively, and bearing data in the OCh on the continuous frequency slots for transmission, the problem of how to map and multiplex data effectively after the flexible grid technology is introduced into the related art is solved, so that the operators can deploy a beyond 100 G optical transport system more flexibility, thereby improving optical fibre spectrum utilization efficiency and system flexibility and compatibility.

Preferably, in step S102, dividing the OTUCnAG into the plurality of OTUCmTGs in the byte-interleaving way comprises: the OTUCnAG having the rate of n*100 Gbit/s is divided into n Optical Transmit Unit subframes (OTUCs) having a rate of 100 Gbit/s; and the n OTUCs having the rate of 100 Gbit/s are packeted into L OTUCmTGs having the same or different rates, wherein the content in the [n*(k−1)+i]th column byte area of the OTUCnAG having the rate of n*100 Gbit/s is taken as the content in the kth column byte area of the ith of the OTUCs having the rate of 100 Gbit/s, and the frame structure of the OTUC has four rows and 4080 columns, with n, i, k and L being all positive integers, and n>L, 1≤i≤n, 1≤k≤4080.

Preferably, an OTU overhead byte of each of the OTUCs carries at least one of the following: a serial number of the OTUC, and a serial number of the OTUCnAG to which the OTUC belongs.

Preferably, in step S104, each of the OTUCmTGs is distributed on the plurality of electrical channel signals for transmission; and then the plurality of electrical channel signals corresponding to the same OTUCmTG are mapped into one of the OChs for transmission, wherein OChs corresponding to all of the OTUCmTGs under the same OTUCnAG belong to the same Optical Channel Administrative Group (OChAG).

An embodiment of the disclosure provides a method for demapping data which has been processed in the above-mentioned mapping method, and the method comprises: after all of the OTUCs having the same Trail Trace Identifier (TTI) or the same OTUCnAG serial number are received completely according to TTI or OTUCnAG serial number in the OTU overhead bytes of the OTUCs, the content in the $k^{th}$ column byte area of each of the OTUCs is taken as the content of the $[n*(k-1)+x]^{th}$ column byte area of the demapped OTUCnAG in an ascending order of the serial numbers of the OTUCnAGs to which the OTUCs belongs, where x is the serial number of the OTUC in the OTUCnAG, with x being an integer, and 1≤x≤n.

An embodiment of the disclosure provides another method for demapping data which has been processed in the above-mentioned mapping method, and the method comprises: a received optical signal of each OCh in one of the OTUCnAGs is converted into a plurality of groups of electrical channel signals respectively, wherein each group of the plurality of groups of electrical channel signals is converted into one OTUC.

Figure 2:
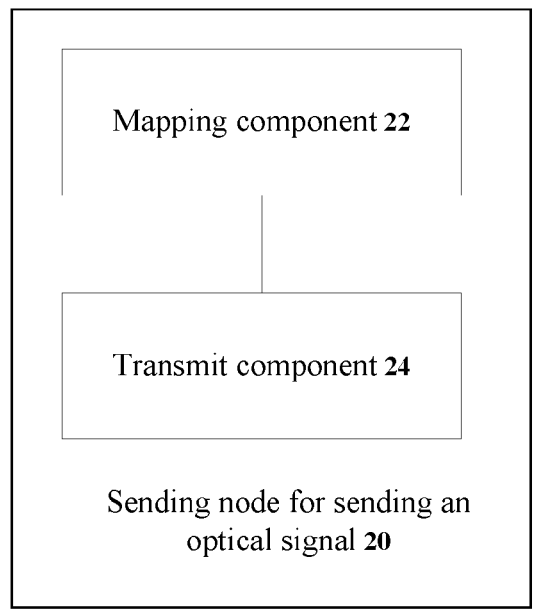
FIG. 2 is a structural diagram of a sending node for sending an optical signal according to an embodiment of the disclosure.

In an embodiment of the disclosure, a sending node for sending an optical signal is provided. FIG. 2 is a structural diagram of a sending node for sending an optical signal according to an embodiment of the disclosure, and as shown in FIG. 2, the sending node 20 comprises: a mapping component 22 configured to divide an OTUCnAG which is formed after an OTU overhead is added to an ODUCn having a rate of n*100 Gbit/s into a plurality of OTUCmTGs in a byte-interleaving way, wherein the rate of the OTUCnAG is n*100 Gbit/s, and the rate of the OTUCmTG is m*100 Gbit/s, with both m and n being positive integers, and m≤n; and a transmit component 24 coupled to the mapping component 22 and configured to map each of the OTUCmTGs into a corresponding Optical Channel (OCh) respectively, and to bear data in the OCh on continuous frequency slots for transmission.

By means of the above-mentioned sending node 20, the mapping component 22 divides the OTUCnAG which is formed after the OTU overhead is added to the ODUCn having the rate of n*100 Gbit/s into the plurality of OTUCmTGs in the byte-interleaving way, and the transmit component 24 maps each of the OTUCmTGs into the corresponding OCh respectively, and bears data in the OCh on the continuous frequency slots for transmission. The problem of how to map and multiplex data effectively after the flexible grid technology is introduced into the related art is solved, so that the operators can deploy a beyond 100 G optical transport system more flexibility, thereby improving optical fibre spectrum utilization efficiency and system flexibility and compatibility.

Figure 3:
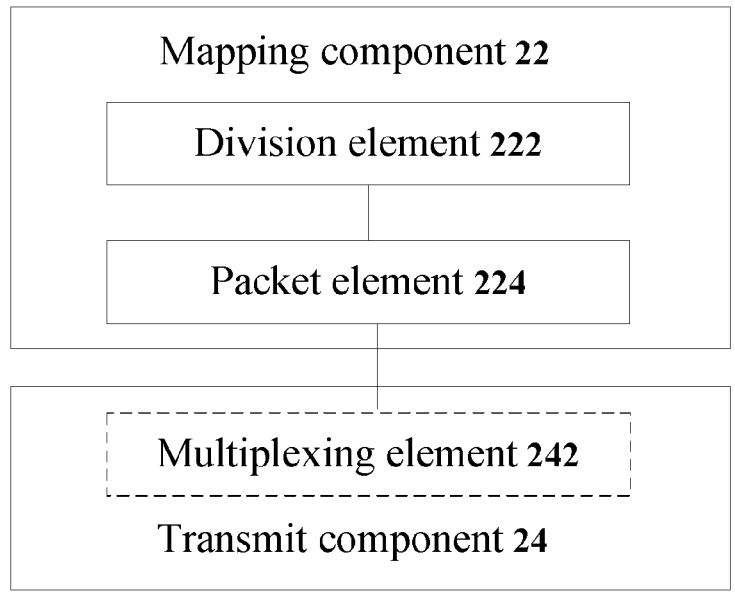
FIG. 3 is a structural diagram of a sending node for sending an optical signal according to a preferred embodiment of the disclosure.

FIG. 3 is a structural diagram of a sending node for sending an optical signal according to a preferred embodiment of the disclosure, and as shown in FIG. 3, the mapping component 22 comprises: a division element 222 which is configured to divide an OTUCnAG having a rate of n*100 Gbit/s into n OTUCs having a rate of 100 Gbit/s, wherein the content in the [n*(k−1)+i]th column byte area of the OTUCnAG having the rate of n*100 Gbit/s is taken as the content in the kth column byte area of the ith of the OTUCs having the rate of 100 Gbit/s, and the frame structure of the OTUC has four rows and 4080 columns, with n, i, k and L being all positive integers, and n>L, 1≤i≤n, 1≤k≤4080; and a packet element 224 which is coupled to the division element 222 and is configured to group the n OTUCs having the rate of 100 Gbit/s into L OTUCmTGs having the same or different rates.

Preferably, the transmit component 24 comprises: a multiplexing element 242 which is configured to distribute the OTUCmTGs on a plurality of electrical channel signals for transmission, and then mapping the plurality of electrical channel signals corresponding to the same OTUCmTG into one OCh for transmission, wherein OChs corresponding to all of the OTUCmTGs under the same OTUCnAG belong to the same OChAG.

In an embodiment of the disclosure, a receiving node 40 for receiving an optical signal sent by the above-mentioned sending node 20 for sending an optical signal is provided.

Figure 4:
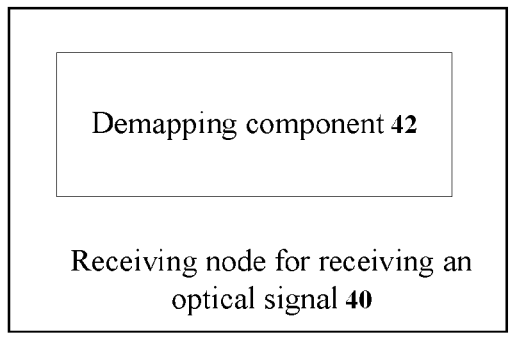
FIG. 4 is a structural diagram of a receiving node for receiving an optical signal according to an embodiment of the disclosure.

FIG. 4 is a structural diagram of a receiving node for receiving an optical signal according to an embodiment of the disclosure, and as shown in FIG. 4, the receiving node 40 comprises: a demapping component 42 which is configured to, after all of the OTUCs having the same TTI or the same OTUCnAG serial number are received completely according to the TTI or OTUCnAG serial number in the OTU overhead bytes of the OTUCs, the content in the $k^{th}$ column byte area of each of the OTUCs as the content of the $[n*(k-1)+x]^{th}$ column byte area of the demapped OTUC-nAG in an ascending order of the serial numbers of the OTUCnAGs to which the OTUCs belongs, where x is the serial number of the OTUC in the OTUCnAG, with x being an integer, and $1 \le x \le n$.

Figure 5:
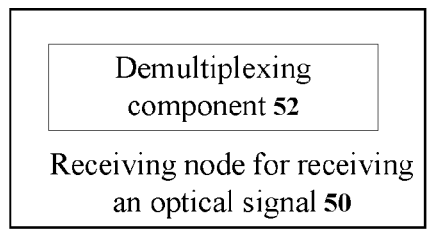
FIG. 5 is a structural diagram of a receiving node for receiving an optical signal according to a preferred embodiment of the disclosure.

In an embodiment of the disclosure, another receiving node 50 for receiving an optical signal sent by the above-mentioned sending node 20 for sending an optical signal is further provided. FIG. 5 is a structural diagram of a receiving node for receiving an optical signal according to a preferred embodiment of the disclosure, and as shown in FIG. 5, the receiving node 50 comprises: a demultiplexing component 52 which is configured to convert a received optical signal of each OCh in one of the OTUCnAGs into a plurality of groups of electrical channel signals respectively, wherein each group of the plurality of groups of electrical channel signals is converted into one OTUC.

Figure 6:
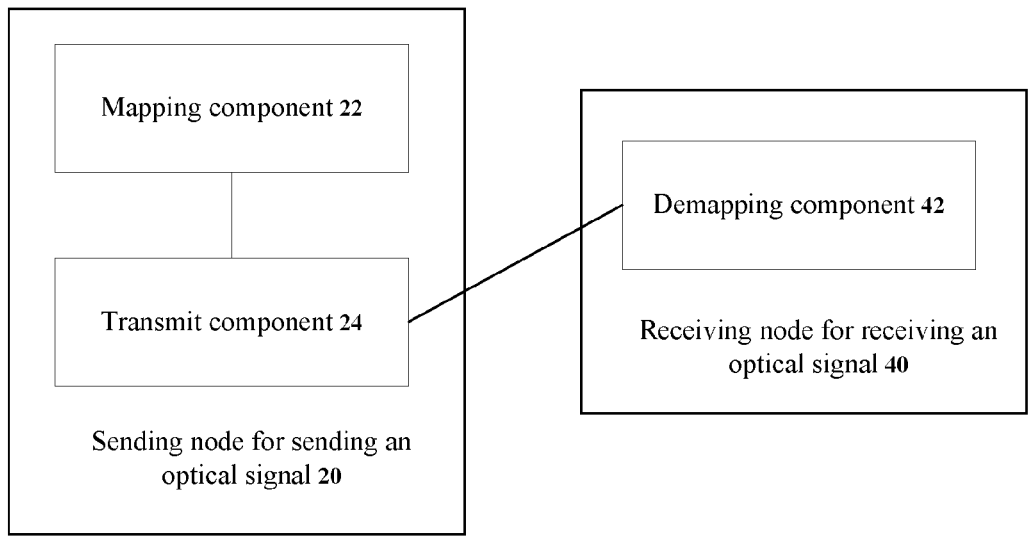
FIG. 6 is a structural diagram of a transmit system for transmitting an optical signal according to an embodiment of the disclosure.

In addition, a transmit system for transmitting an optical signal is provided in an embodiment of the disclosure. FIG. 6 is a structural diagram of a transmit system for transmitting an optical signal according to an embodiment of the disclosure, and as shown in FIG. 6, the system comprises the sending node 20 for sending an optical signal and the receiving node 40 for receiving an optical signal.

Figure 7:
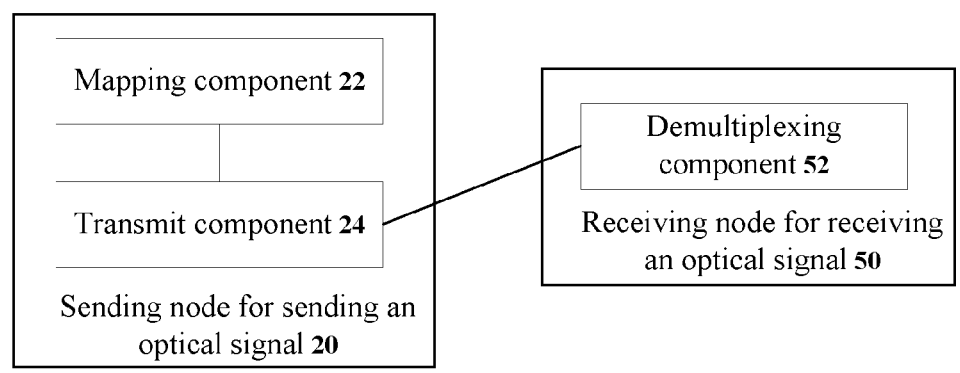
FIG. 7 is a structural diagram of a transmit system for transmitting an optical signal according to a preferred embodiment of the disclosure.

According to an embodiment of the disclosure, another transmit system for transmitting an optical signal is further provided. FIG. 7 is a structural diagram of a transmit system for transmitting an optical signal according to an embodiment of the disclosure, and as shown in FIG. 7, the system comprises the sending node 20 for sending an optical signal and the receiving node 50 for receiving an optical signal.

The implementation process of the above-mentioned embodiments is explained below with reference to preferred embodiments and drawings in detail.

Embodiment I

This embodiment provides a method for mapping and multiplexing data in an optical transport network, so as to at least solve the above-mentioned problem of how to map and multiplex data effectively after the flexible grid technology is introduced into the related art.

Figure 8:
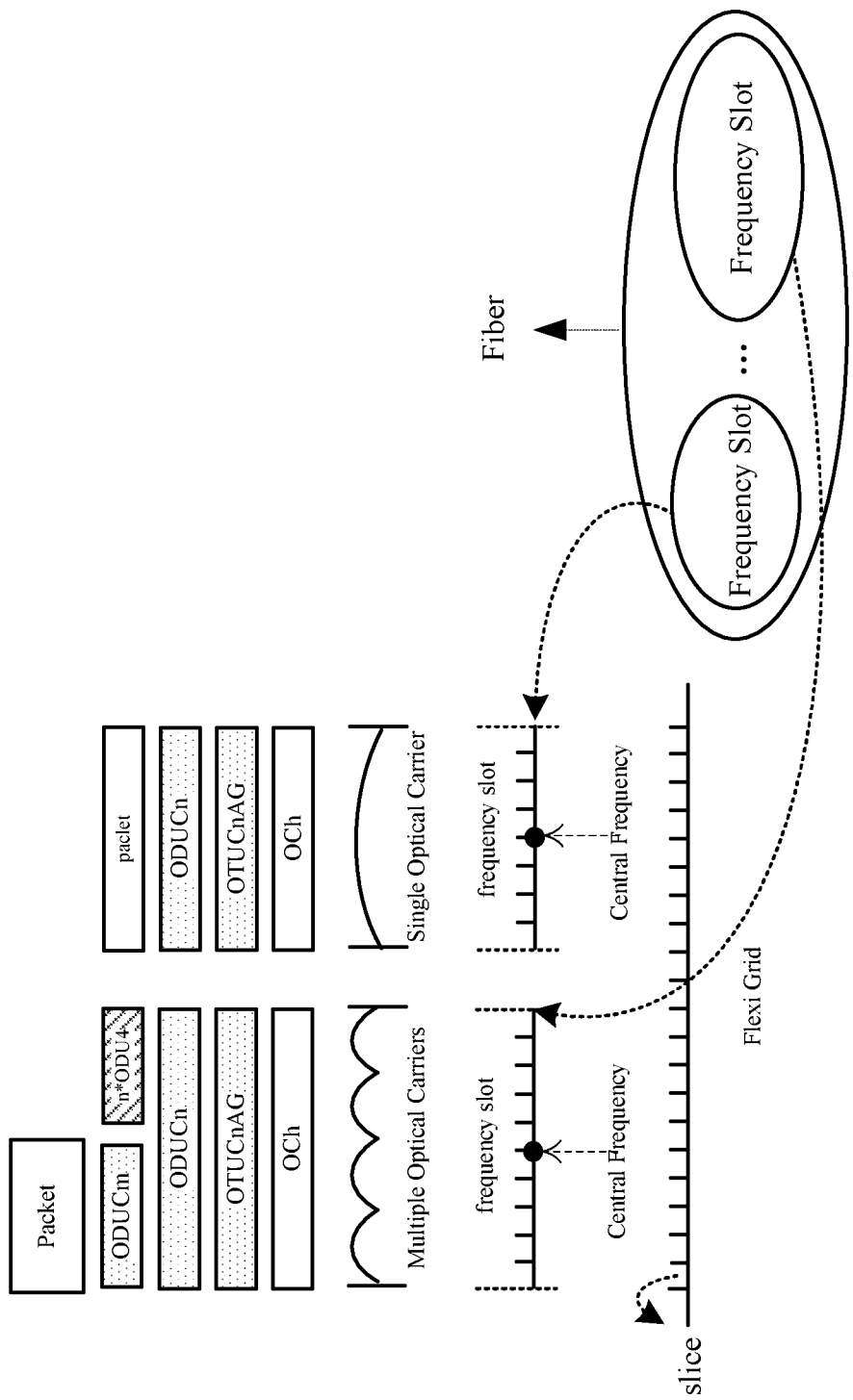
FIG. 8 is a schematic diagram of a mapping and multiplexing processing flow of an ODUCn-OTUCnAG-OCh according to the first embodiment of the disclosure.

FIG. 8 is a schematic diagram of a mapping and multiplexing processing flow of an ODUCn-OTUCnAG-OCh according to the first embodiment of the disclosure, and as shown in FIG. 8, packet service data is mapped to an ODUCn, which represents a higher rate than that of ODUk (k=0.1, 2, 2e, 3, 4)), and the ODUCn is mapped into an OTU high-speed administrative group (OTUCnAG), and then the OTUCnAG is mapped into an OCh, wherein the rates of the ODUCn, the OTUCnAG and the OCh are all N times of 100 Gbit/s, and the size of a branch time sequence of the ODUCn is 100 Gbit/s, N being a positive integer greater than or equal to 2.

It should be noted that the OTUCnAG is an OTU high-speed administrative group, and it is a compound signal having the rate of N*100 Gbit/s and is composed of N 100 G OTU frames. For example, OTUC2AG represents 200 Gbit/s, and OTUC4AG represents 400 Gbit/s; and OChAG represents an optical channel signal set used for bearing the OTUCnAG; if these optical signals pass the same route, the OChAG provides a single entity to administrate these signals; and if these signals pass different routes, multiple OChs are required, then signals passing the same route are administrated by one optical channel.

Preferably, an ODU4 bearing a low-order optical data unit (ODUk) or packet service data and a low-order ODUCm (m<n) bearing the packet service data can be jointly multiplexed to a high-order ODUCn, wherein the ODUk at least comprises one of the following: ODU0, ODU1, ODU2, ODU2e, ODU3 and ODUflex; and then the high-order ODUCn is mapped into the OTUCnAG.

Figure 9:
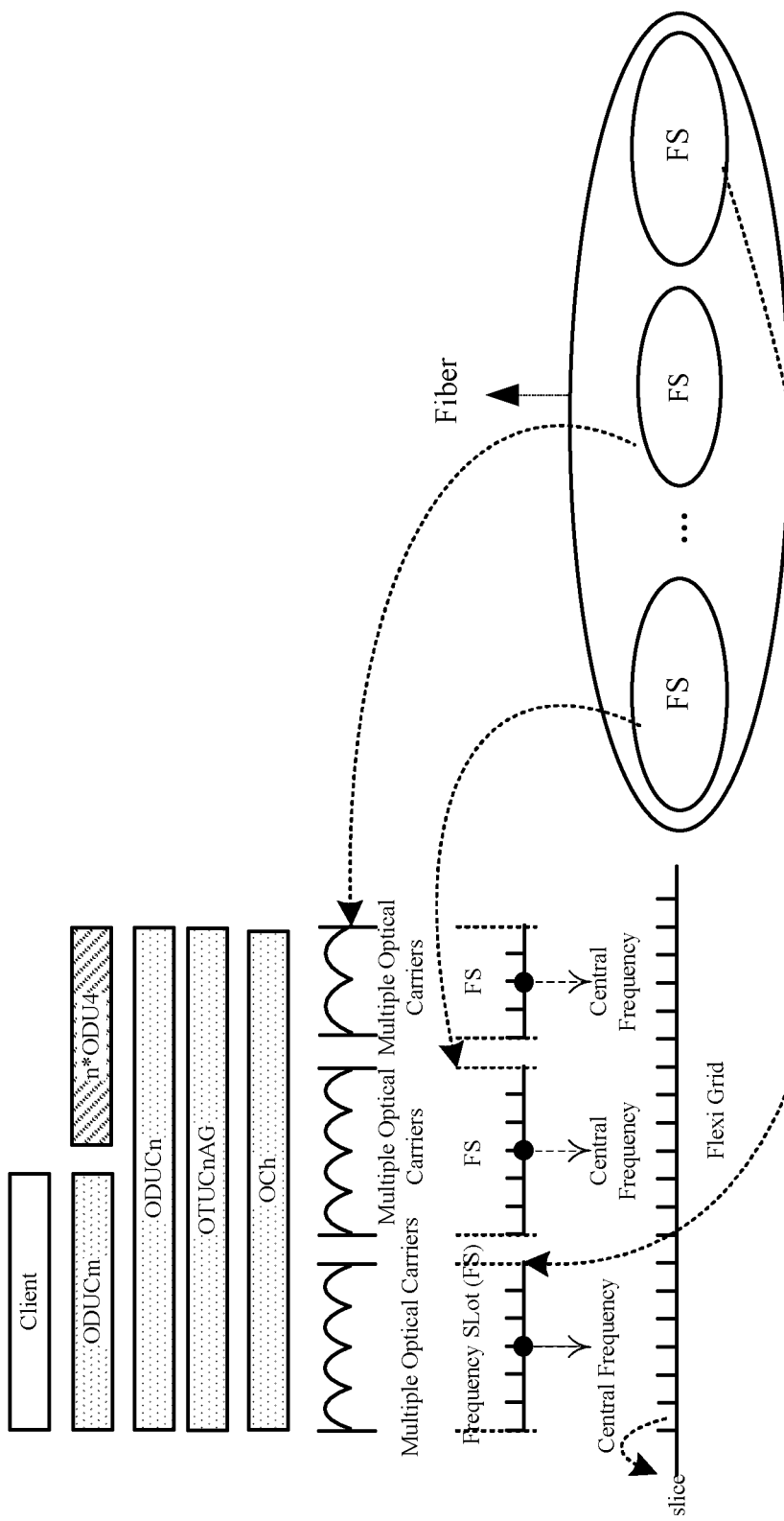
FIG. 9 is a schematic diagram of another mapping and multiplexing processing flow of an ODUCn-OTUCnAG-OChAG according to the first embodiment of the disclosure.

FIG. 9 is a schematic diagram of another mapping and multiplexing processing flow of an ODUCn-OTUCnAG-OCh according to the first embodiment of the disclosure, wherein the multiple optical signals contained in the OCh are born by a discrete frequency spectrum and pass the same route. As shown in FIG. 9, the ODUCn is mapped into the OTUCnAG, the OTUCnAG passes a single OCh, and the optical signals in the OCh pass the same route and occupy the discrete frequency spectrum. These signals are administrated by a single OCh entity.

Figure 10:
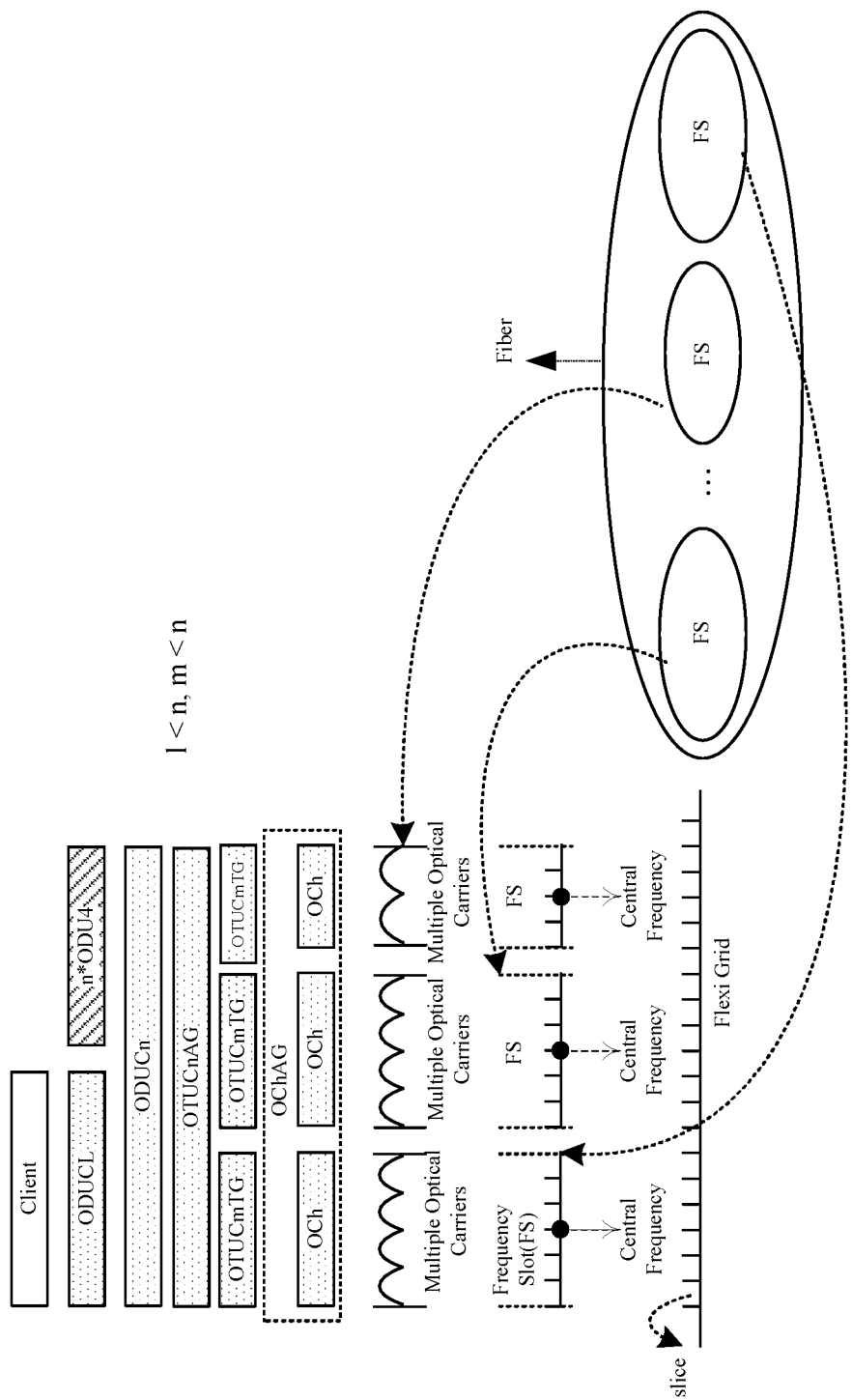
FIG. 10 is a schematic diagram of a mapping and multiplexing processing flow of an ODUCn-OTUCnAG-z*OTUCmTG-OChAG according to embodiment one of the disclosure.

FIG. 10 is a schematic diagram of a mapping and multiplexing processing flow of an ODUCn-OTUCnAG-z*OTUCmTG-OChAG according to the first embodiment of the disclosure, wherein the multiple optical signals contained in the OChAG are born by the discrete frequency spectrum and pass different routes. As shown in FIG. 10, the ODUCn being mapped to the OTUCnAG and then the OTUCnAG being mapped to the OChAG comprise: the OTUCnAG is reversely multiplexed to multiple OTUCmTG, and then the OTUCmTG is mapped into a corresponding OCh, wherein the rates of the OTUCmTG are all M times of 100 Gbit/s, M being larger than or equal to 1 and M being less than N. The OTUCmTG (Transport Group, m<n) is a compound signal, and the rate thereof is m*100 Gbit/s. Each of the OTUCmTGs has the same rate level, or all the OTUCmTGs have different rate levels.

Figure 11:
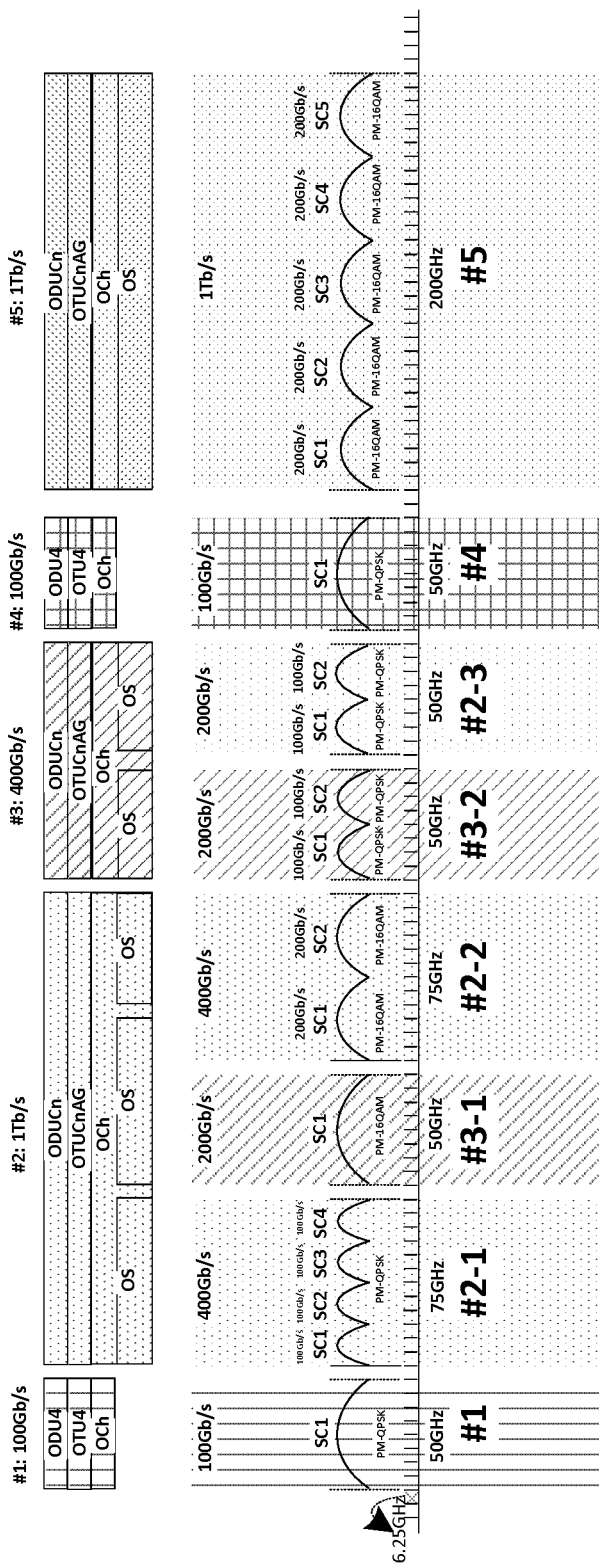
FIG. 11 is a schematic diagram of a processing flow for mapping, multiplexing and transmitting five signals on the same optical fibre according to the first embodiment of the disclosure.

FIG. 11 is a schematic diagram of a processing flow for mapping, multiplexing and transmitting five signals on the same optical fibre according to the first embodiment of the disclosure, and as shown in FIG. 11, there are five services transported on one optical fibre, wherein #1 and #4 are signals having a rate of 100 Gbit/s (Gb/s) and respectively occupying 50 GHz frequency spectrum resources, and the single carrier transmission with a polarization-multiplexed quadrature phase shift keying (PM-QPSK) modulation format is adopted.

2 is a signal having a rate of 1 Tbit/s (1 Tb/s), the payload of the OCh signal is supported by three optical signals (OS), and each optical signal corresponds to one media channel, wherein the bit rates of the media channels #2-1 and #2-2 corresponding to the two optical signals are 400 Gb/s. The media channel #2-1 is transmitted by four sub carriers (SC) SC1, SC2, SC3 and SC4 that all adopt the PM-QPSK modulation format, wherein the bit rate of each sub carrier is 100 Gbit/s (i.e. 100 Gb/s), and 75 GHz frequency spectrum resources are occupied totally; the media channel #2-2 is transmitted by two sub carriers (SC) SC1 and SC2 that both adopt the PM-16QAM modulation format, wherein the bit rate of each sub carrier is 200 Gbit/s, and 75 GHz frequency spectrum resources are occupied totally; the bit rate of a media channel #2-3 corresponding to the remaining optical signal is 200 Gbit/s, the media channel #2-3 is transmitted by two sub carriers (SC) SC1 and SC1 that both adopt the PM-QPSK modulation format, wherein the bit rate of each sub carrier is 100 Gbit/s, and 50 GHz frequency spectrum resources are occupied totally.

3 is a signal having a rate of 400 Gbit/s (400 Gb/s), the payload of the OCh signal is supported by two optical signals (OSs), and each optical signal corresponds to one media channel, wherein the bit rates of the media channels #3-1 and #3-2 corresponding to the two optical signals are both 200 Gb/s. The media channel #3-1 is transmitted by a single sub carrier SC1 that adopts the PM-16QAM modulation format, and 50 GHz frequency spectrum resources are occupied; and the media channel #3-2 is transmitted by two sub carriers SC1 and SC2 that both adopt the PM-QPSK modulation format, the bit rate of each sub carrier is 100 Gbit/s, and 50 GHz frequency spectrum resources are occupied totally.

5 is a signal having a rate of 1 Tbit/s, the payload of the OCh signal is supported by one optical signal (OS), and the optical signal corresponds to one media channel, wherein the signal is transmitted by five sub carriers SC1, SC2, SC3, SC4 and SC5 that adopt the PM-16QAM modulation format, the bit rate of each sub carrier is 200 Gbit/s, and 200 GHz frequency spectrum resources are occupied.

Figure 12:
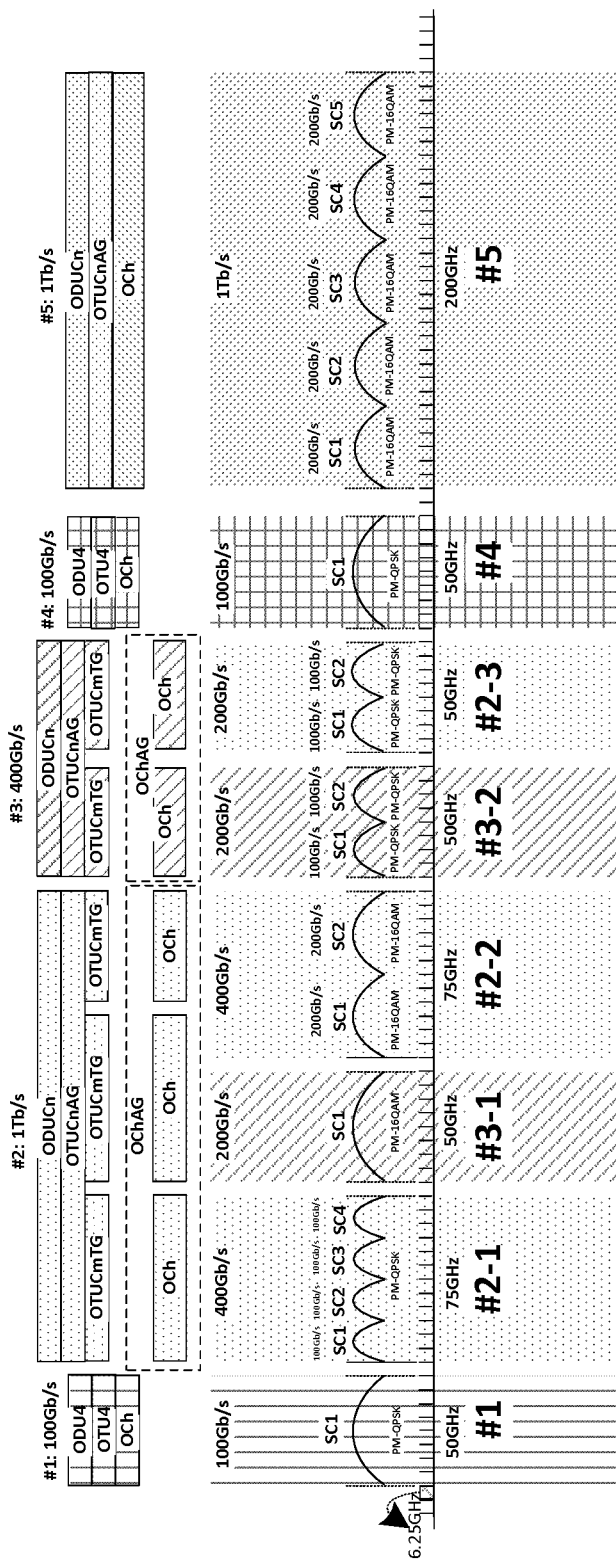
FIG. 12 is a schematic diagram of another processing flow for mapping, multiplexing and transmitting five signals on the same optical fibre according to the first embodiment of the disclosure.

FIG. 12 is a schematic diagram of another processing flow for mapping, multiplexing and transmitting five signals on the same optical fibre according to the first embodiment of the disclosure, and as shown in FIG. 12, there are five services transported on one optical fibre, wherein #1 and #4 are signals having a rate of 100 Gbit/s and respectively occupying 50 GHz frequency spectrum resources, and the single carrier transmission of a PM-QPSK modulation format is adopted.

2 is a signal having a rate of 1 Tbit/s, the OTUCnAG is supported by three OCHs, and each of the OCHs corresponds to one media channel, wherein the bit rates of the media channels #2-1 and #2-2 corresponding to the two OCHS are 400 Gbit/s. The media channel #2-1 is transmitted by four sub carriers SC1, SC2, SC3 and SC4 that all adopt the PM-QPSK modulation format, the bit rate of each sub carrier is 100 Gbit/s, and 75 GHz frequency spectrum resources are occupied totally; the media channel #2-2 is transmitted by two sub carriers SC1 and SC2 that both adopt the PM-16QAM modulation format, the bit rate of each sub carrier is 200 Gbit/s, and 75 GHz frequency spectrum resources are occupied totally; the bit rate of a media channel #2-3 corresponding to the remaining OCh is 200 Gbit/s, the media channel #2-3 is transmitted by two sub carriers SC1 and SC1 that both adopt the PM-QPSK modulation format, the bit rate of each sub carrier is 100 Gbit/s, and 50 GHz frequency spectrum resources are occupied totally.

3 is a signal having a rate of 400 Gbit/s (400 Gb/s), the payload of the OTUCnAG signal is supported by two OChs, and each OCh-P corresponds to one media channel, wherein the bit rates of the media channels #3-1 and #3-2 corresponding to the two OChs are both 200 Gbit/s. The media channel #3-1 is transmitted by a single sub carrier SC1 that adopts the PM-16QAM modulation format, and 50 GHz frequency spectrum resources are occupied. The media channel #3-2 is transmitted by two sub carriers SC1 and SC2 that both adopt the PM-QPSK modulation format, the bit rate of each sub carrier is 100 Gbit/s, and 50 GHz frequency spectrum resources are occupied totally.

5 is a signal having the rate of 1 Tbit/s, the payload of the OTUCnAG signal is supported by one OCh, and the OCh corresponds to one media channel, wherein the signal is transmitted by five sub carriers SC1, SC2, SC3, SC4 and SC5 that adopt the PM-16QAM modulation format, the bit rate of each sub carrier is 200 Gbit/s, and 200 GHz frequency spectrum resources are occupied.

Embodiment II

Figure 13:
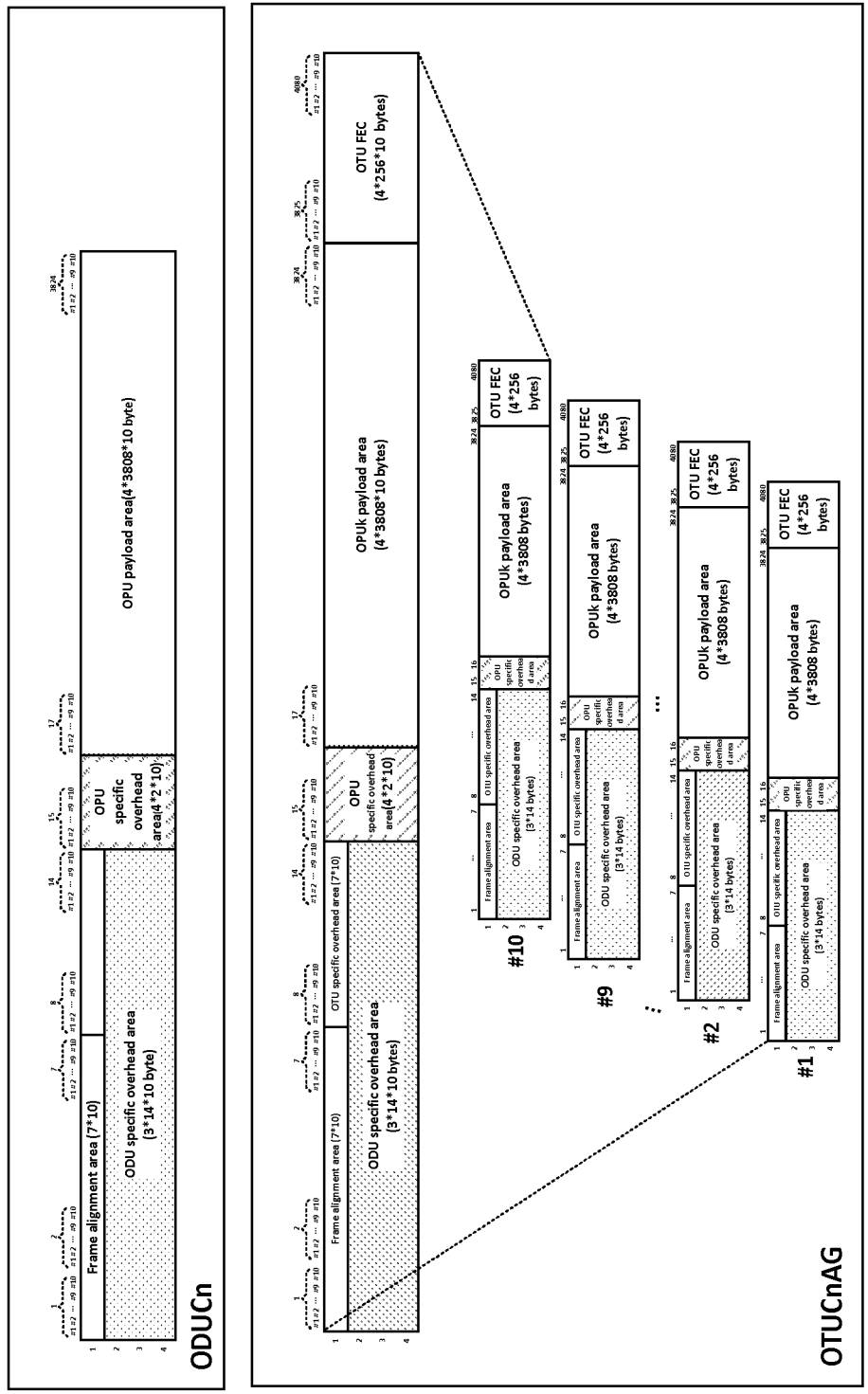
FIG. 13 is a schematic diagram of a processing method for mapping and multiplexing an ODUCn into an OTUCnAG according to the second embodiment of the disclosure.

FIG. 13 is a schematic diagram of a processing method for mapping and multiplexing an ODUCn into an OTUCnAG according to the second embodiment of the disclosure; as shown in FIG. 13, the embodiment provides a method for mapping ODUCn data to the OTUCnAG and transmitting OTUCnAG data streams at an optical layer, and it provides an example of mapping one ODUCn (n=10) having a rate of 1 Tbit/s into one OTUCn having a rate of 1 Tbit/s at a data sending end and transmitting the OTUCn at the optical layer.

Step 1: after an OTU overhead and a Forward Error Correction (FEC) are added to an ODUCn frame, a complete OTUCnAG is formed. In the embodiment, the ODUCn having a rate of 1 Tbit/s as shown in FIG. 13 is mapped into the OTUCnAG frame.

Step 2: the OTUCnAG frame is divided into three OTUC-mTG frames, which are respectively OTUC4TG #1 (400 Gbit/s), OTUC4TG #2 (400 Gbit/s) and OTUC2TG #3 (200 Gbit/s), wherein the three frames are respectively transmitted on three sections of continuous frequency spectra, which are respectively OCh-P #1, OCh-P #2 and OCh-P #3.

The OTUCnAG are divided into three OTUCmTG frames according to a byte-interleaving scheme, which are respectively the OTUC4TG #1, the OTUC4TG #2 and the OTUC2TG #3. In order to describe the following algorithms conveniently, different OTUCmTGs are distinguished and respectively labelled as OTUCiTG, OTUCjTG and OTUpTG, wherein i+j+p=n, and i, j, p and n are all positive integers. The OTUC4TG is formed of four OTUCs according to a byte-interleaving scheme, the OTUC2TG is formed of two OTUCs according to the byte-interleaving scheme, and the OTUC is a frame structure of 4*4808 defined by protocol G.709.

For example, (1) By means of a byte-interleaving method:

the byte area content of four rows and the first column of the OTUCnAG is taken as that of four rows and the first column of the OTUC #1;

the byte area content of four rows and the second column of the OTUCnAG is taken as that of four rows and the first column of the OTUC #2;

the byte area content of four rows and the third column of the OTUCnAG is taken as that of four rows and the first column of the OTUC #3; and the byte area content of four rows and the fourth column of the OTUCnAG is taken as that of four rows and the first column of the OTUC #4.

Four rows of byte areas of the first column of the above-mentioned four OTUC #1, OTUC #2, OTUC #3 and OTUC #4 respectively compose a four rows of byte area of the first column, the second column, the third column and the fourth column of the OTUCiTG according to the byte-interleaving scheme and compose a logical OTUCiTG; actually, on an OTN Framer chip, such an OTUCiTG does not need to be performed reassembly.

(2) By means of a byte-interleaving method:

the byte area content of four rows and the fifth column of the OTUCnAG is taken as that of four rows and the first column of the OTUC #5;

the byte area content of four rows and the sixth column of the OTUCnAG is taken as that of four rows and the first column of the OTUC #6;

the byte area content of four rows and the seventh column of the OTUCnAG is taken as that of four rows and the first column of the OTUC #7; and the byte area content of four rows and the eighth column of the OTUCnAG is taken as that of four rows and the first column of the OTUC #8.

Four rows of byte areas of the first column of the above-mentioned four OTUC #5, OTUC #6, OTUC #7 and OTUC #8 respectively compose a four rows of byte area of the first column, the second column, the third column and the fourth column of the OTUCjTG according to the byte-interleaving scheme and compose a logical OTUCjTG; actually, on an OTN Framer chip, such an OTUCjTG does not need to be performed reassembly.

(3) By means of a byte-interleaving method:

the byte area content of four rows and the ninth column of the OTUCnAG is taken as that of four rows and the first column of the OTUC #9; and the byte area content of four rows and the tenth column of the OTUCnAG is taken as that of four rows and the first column of the OTUC #10.

Four rows of byte areas of the first column of the above-mentioned two OTUC #9 and OTUC #10 respectively compose a four rows of byte area of the first column and the second column of the OTUCpTG according to the byte-interleaving scheme and compose a logical OTUCpTG; actually, on an OTN Framer chip, such an OTUCpTG does not need to be performed reassembly.

(4) By means of a byte-interleaving method:

the byte area content of four rows and the eleventh column of the OTUCnAG is taken as that of four rows and the second column of the OTUC #1;

the byte area content of four rows and the twelfth column of the OTUCnAG is taken as that of four rows and the second column of the OTUC #2;

the byte area content of four rows and the thirteenth column of the OTUCnAG is taken as that of four rows and the second column of the OTUC #3; and the byte area content of four rows and the fourteenth column of the OTUCnAG is taken as that of four rows and the second column of the OTUC #4.

Four rows of byte areas of the second column of the above-mentioned four OTUC #1, OTUC #2, OTUC #3 and OTUC #4 respectively compose a four rows of byte area of the fifth column, the sixth column, the seventh column and the eighth column of the OTUCiTG according to the byte-interleaving scheme and compose a logical OTUCiTG; actually, on an OTN Framer chip, such an OTUCiTG does not need to be performed reassembly.

(5) By means of a byte-interleaving method:

the byte area content of four rows and the fifteenth column of the OTUCnAG is taken as that of four rows and the second column of the OTUC #5;

the byte area content of four rows and the sixteenth column of the OTUCnAG is taken as that of four rows and the second column of the OTUC #6;

the byte area content of four rows and the seventeenth column of the OTUCnAG is taken as that of four rows and the second column of the OTUC #7; and the byte area content of four rows and the eighteenth column of the OTUCnAG is taken as that of four rows and the second column of the OTUC #8.

Four rows of byte areas of the second column of the above-mentioned four OTUC #5, OTUC #6, OTUC #7 and OTUC #8 respectively compose a four rows of byte area of the fifth column, the sixth column, the seventh column and the eighth column of the OTUCjTG according to the byte-interleaving scheme and compose a logical OTUCjTG; actually, on an OTN Framer chip, such an OTUCjTG does not need to be performed reassembly.

(6) By means of a byte-interleaving method:

the byte area content of four rows and the nineteenth column of the OTUCnAG is taken as that of four rows and the second column of the OTUC #9; and the byte area content of four rows and the twentieth column of the OTUCnAG is taken as that of four rows and the second column of the OTUC #10.

Four rows of byte areas of the second column of the above-mentioned two OTUC #9 and OTUC #10 respectively compose a four rows of byte area of the third column and the fourth column of the OTUCpTG according to the byte-interleaving scheme and compose a logical OTUCpTG; actually, on an OTN Framer chip, such an OTUCpTG does not need to be performed reassembly. Other cases may be deduced based on this case.

Taking the OTUCnAG being reversely multiplexed to the OTUCiTG, the OTUCjTG and the OTUCpTG as an example, a more universal interleaving scheme is explained; the OTUCnAG circularly executes k times of the following byte-interleaving steps in sequence, the cyclic variable value increases from 1 to k, and the value of the k is 4080, wherein 4080 is the number of columns of the OTUC, and $i + j + p = n$.

for (k=1, k++, k <=4080)
{
Step 2.1:

the byte area content of four rows and the $(10(k-1) + 1)^{th}$ column of the OTUCnAG is taken as that of four rows and the $k^{th}$ column of the OTUC #1;

the byte area content of four rows and the $(10(k-1) + 2)^{th}$ column of the OTUCnAG is taken as that of four rows and the $k^{th}$ column of the OTUC #2;

......

the byte area content of four rows and the $(10(k-1) + (i-1))^{th}$ column of the OTUCnAG is taken as that of four rows and the $k^{th}$ column of the OTUC #(i-1); and the byte area content of four rows and the $(10(k-1) + i)^{th}$ column of the OTUCnAG is taken as that of four rows and the $k^{th}$ column of the OTUC #i.

Four rows of byte areas (four bytes totally) of the $k^{th}$ column of the above-mentioned i OTUCs respectively compose a four rows of byte area from the $(i*(k-1) + 1)^{th}$ column, the $(i*(k-1) + 2)^{th}$ column to the $(i*(k-1) + i)^{th}$ column of the OTUCiTG in sequence according to the byte-interleaving scheme and compose a logical OTUCiTG; actually, on an OTN Framer chip, such an OTUCiTG does not need to be performed reassembly. In this embodiment, that is:

four rows of byte area content (four bytes totally) of the $k^{th}$ column of the OTUC #1 composes the $(i*(k-1) + 1)^{th}$ column of the OTUCiTG;

four rows of byte area content (four bytes totally) of the $k^{th}$ column of the OTUC #2 composes the $(i*(k-1) + 2)^{th}$ column of the OTUCiTG;

......

four rows of byte area content (four bytes totally) of the $k^{th}$ column of the OTUC #(i-1) composes the $(i*(k-1) + (i-1))^{th}$ column of the OTUCiTG; and four rows of byte area content (four bytes totally) of the $k^{th}$ column of the OTUC #i composes the $(i*(k-1) + i)^{th}$ column of the OTUCiTG.

For each generated OTUC, the data sending end fills in a serial number of the OTUC #i at the $14^{th}$ column of the first row (one byte totally, and the maximum of the serial number being $2^8$, that is to say, the maximum of the serial number is 256) of each OTUC frame, and the value of the serial number is i. For example, the serial number of the OTUC #1 is #1, the serial number of the OTUC #2 is #2 ......, the serial number of the OTUC #(i-1) is (i-1), and the serial number of the OTUC #i is i. Optionally, an identification of the OTUCnAG to which the OTUC #i belongs is filled in the $13^{th}$ column of the first row (one byte totally, and the maximum of the serial number being $2^8$, that is to say, the maximum of the serial number is 256) of each OTUC frame, it is required that values of all the OTUCs in the OTUCnAG filled in this field are the same.

Step 2.2:

the byte area content of four rows and the $(10 (k-1) + i + 1)^{th}$ column of the OTUCnAG is taken as that of four rows and the $k^{th}$ column of the OTUC #(i+1);

the byte area content of four rows and the $(10 (k-1) + i +2)^{th}$ column of the OTUCnAG is taken as that of four rows and the $k^{th}$ column of the OTUC #(i+2);

......

the byte area content of four rows and the $(10 (k-1) + i + (j-1))^{th}$ column of the OTUCnAG is taken as that of four rows and the $k^{th}$ column of the OTUC #(i+j-1); and the byte area content of four rows and the $(10 (k-1) + i + j)^{th}$ column of the OTUCnAG is taken as that of four rows and the $k^{th}$ column of the OTUC #(i+j).

Four rows of byte areas (four bytes totally) of the $k^{th}$ column of the above-mentioned j OTUCs respectively compose a four rows of byte area from the $(j*(k-1) + 1)^{th}$ column, the $(j*(k-1) + 2)^{th}$ column to the $(j*(k-1) + j)^{th}$ column of the OTUCjTG in sequence according to the byte-interleaving scheme and compose a logical OTUCjTG; actually, on an OTN Framer chip, such an OTUCiTG does not need to be performed reassembly. In this embodiment, that is:

four rows of byte content (four bytes totally) of the $k^{th}$ column of the OTUC #(i+1) composes the $(j*(k-1) + 1)^{th}$ column of the OTUCiTG;

four rows of byte content (four bytes totally) of the $k^{th}$ column of the OTUC #(i+2) composes the $(j*(k-1) + 2)^{th}$ column of the OTUCiTG;

......

four rows of byte content (four bytes totally) of the $k^{th}$ column of the OTUC #(i+j-1) composes the $(j*(k-1) + (j-1))^{th}$ column of the OTUCiTG; and four rows of byte content (four bytes totally) of the $k^{th}$ column of the OTUC #(i+j) composes the $(j*(k-1) + j)^{th}$ column of the OTUCiTG.

For the generated j OTUCs, the data sending end fills in a serial number of the OTUC #(i+j) at the $14^{th}$ column of the first row of each OTUC frame, and the value of the serial number is (i+j), for example, the serial number of the OTUC #(i+1) is #(i+1), the serial number of the OTUC #(i+2) is #(i+2) ......, the serial number of the OTUC #(i+j-1) is (i+j-1), and the serial number of the OTUC #(i+j) is (i+j). Optionally, an identification of the OTUCnAG to which the OTUC #i belongs is filled in the $13^{th}$ column of the first row (one byte totally, and the maximum of the serial number being $2^8$, that is to say, the maximum of the serial number is 256) of each OTUC frame, it is required that values of all the OTUCs in the OTUCnAG filled in this field are the same.

Step 2.3:

the byte area content of four rows and the $(10 (k-1) + i + j + 1)^{th}$ column of the OTUCnAG is taken as that of four rows and the $k^{th}$ column of the OTUC #(i+j+1);

the byte area content of four rows and the $(10 (k-1) + i + j + +2)^{th}$ column of the OTUCnAG is taken as that of four rows and the $k^{th}$ column of the OTUC #(i+j+2);

......

the byte area content of four rows and the $(10 (k-1) + i + j + (p-1))^{th}$ column of the OTUCnAG is taken as that of four rows and the $k^{th}$ column of the OTUC #(i+j+p-1); and the byte area content of four rows and the $(10 (k-1) + i + j + p)^{th}$ column of the OTUCnAG is taken as that of four rows and the $k^{th}$ column of the OTUC #(i+j+p).

Four rows of byte areas (four bytes totally) of the $k^{th}$ column of the above-mentioned p OTUCs respectively compose a four rows of byte area from the $(p*(k-1) + 1)^{th}$ column, the $(p*(k-1) + 2)^{th}$ column to the $(p*(k-1) + p)^{th}$ column of the OTUCpTG in sequence according to the byte-interleaving scheme and compose a logical OTUCpTG; actually, on an OTN Framer chip, such an OTUCpTG does not need to be performed reassembly. In this embodiment, that is:

four rows of byte content (four bytes totally) of the $k^{th}$ column of the OTUC #(i+j+1) composes the $(p*(k-1) + 1)^{th}$ column of the OTUCiTG;

four rows of byte content (four bytes totally) of the $k^{th}$ column of the OTUC #(i+j+2) composes the $(p*(k-1) + 2)^{th}$ column of the OTUCiTG;

......

four rows of byte content (four bytes totally) of the $k^{th}$ column of the OTUC #(i+j+p-1) composes the $(p*(k-1) + (p-1))^{th}$ column of the OTUCiTG; and four rows of byte content (four bytes totally) of the $k^{th}$ column of the OTUC #(i+j+p) composes the $(p*(k-1) + p)$th column of the OTUCiTG.

For the generated p OTUCs, the data sending end fills in a serial number of the
OTUC #(i+j+p) at the 14$^{th}$ column of the first row of each OTUC frame, and the value of
the serial number is (i+j+p), for example, the serial number of the OTUC #(i+j+1) is
(i+j+1), the serial number of the OTUC #(i + j + 2) is #(i + j + 2) ......, the serial number of the
OTUC #(i+j+p-1) is (i+j+p-1), and the serial number of the OTUC #(i+j+p) is (i+j+p).
Optionally, an identification of the OTUCnAG to which the OTUC #i belongs is filled in
the 13$^{th}$ column of the first row (one byte totally, and the maximum of the serial number
being 2$^8$, that is to say, the maximum of the serial number is 256) of each OTUC frame, it
is required that values of all the OTUCs in the OTUCnAG filled in this field are the same.
}

Figure 14:
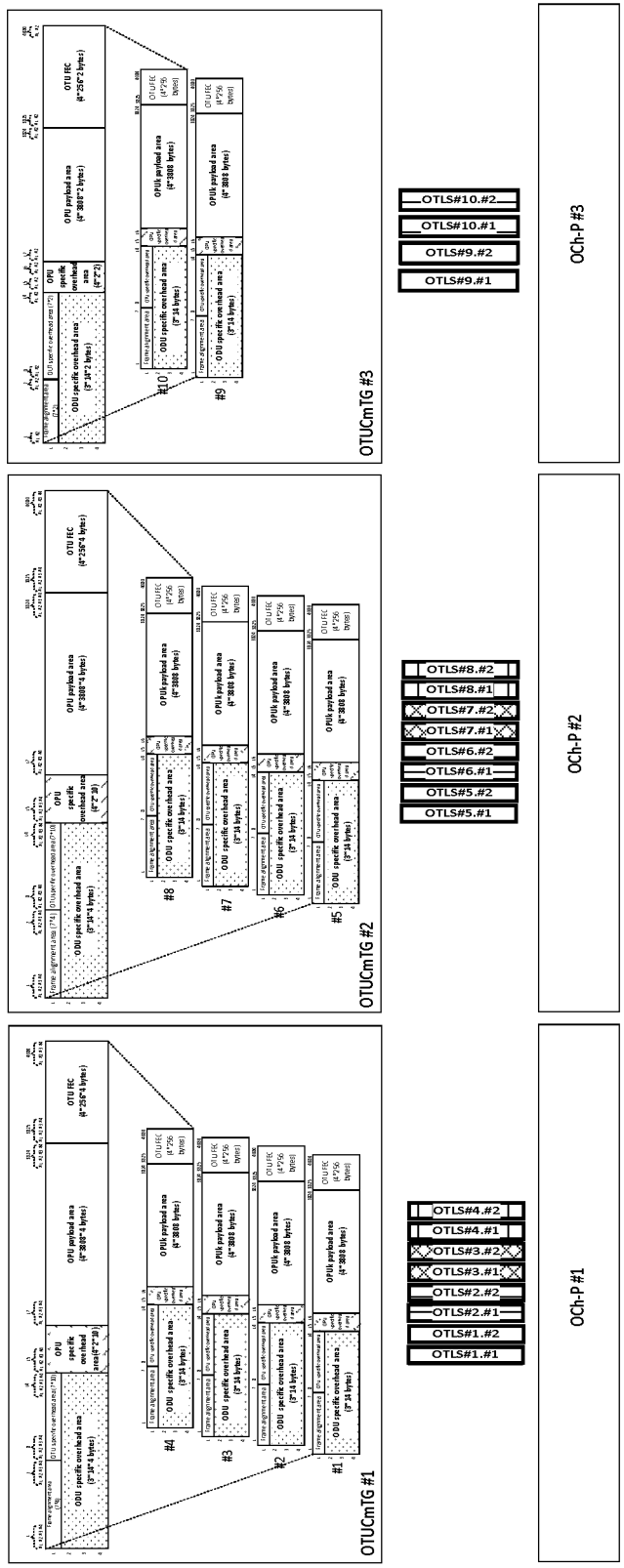
FIG. 14 is a schematic diagram of a processing method for transmitting a plurality of OTUCmTGs, which are obtained by dividing an OTUCnAG, in an optical layer according to the second embodiment of the disclosure.

Step 3:

FIG. 14 is a schematic diagram of a processing method for transmitting multiple
OTUCmTGs, which are obtained by dividing an OTUCnAG, in an optical layer according
to the second embodiment of the disclosure; as shown in FIG. 14, for the n OTUCs (the rate
of the OTUC being 100Gbit/s, and it being a frame structure with 4*4080 defined by
G709) generated in step 2, OTUC #1, OTUC #2......OTUC #(i-1) and OTUC #i are
respectively transmitted in an optical signal OCh-P #1 through i groups of OTLC.m;
OTUC #(i+1), OTUC #(i+2)......OTUC #(i+j-1) and OTUC #(i+j) are respectively
transmitted in an optical signal #2 through j groups of OTLC.m; and OTUC #(i+j+1),
OTUC #(i+j+2)......OTUC #(i+j+p-1) and OTUC #(i+j+p) are respectively transmitted in
an optical signal #3 through p groups of OTLC.m. The rate of the OTLC.m is 100Gbit/s
and is divided into m optical transmit channels for transmission, and the rate of each
optical transmit channel is dividing 100G by m, for example, when the value of m is 4, the
rate of optical transmit channel is 25G, and when the value of m is 2, the rate of optical
transmit channel is 50G.

Embodiment III

As shown in FIG. 13 and FIG. 14, an embodiment provides a method for receiving data sent according to the method provided by the embodiment II from an optical layer and demapping and demultiplexing the data from multiple OTUCmTGs to form an OTUCn and an ODUCn. The embodiment provides an example of receiving data from multiple discrete frequency spectrum optical signals at a data receiving end and assembling the OTUCmTGs on multiple discrete frequency spectra into a complete OTUCn and ODUCn frame.

Step 1: the data receiving end converts 10 groups of OTLC.m born by the optical signals of three discrete frequency spectra OCh-P #1, OCh-P #2 and OCh-P #3 into 10 OTUC frames, and multiple OTUC frames contained in each discrete frequency spectrum compose one OTUCmTG frame logically, which is respectively an OTUCiTG, an OTUCjTG and an OTUCpTG. For example, the value of i in the OTUCiTG being 4 represents that four OTUC frames are contained, which are respectively OTUC #1, OTUC #2, OTUC #3 and OTUC #4; the value of j in the OTUCjTG being 4 represents that four OTUC frames are contained, which are respectively OTUC #5, OTUC #6, OTUC #7 and OTUC #8; and the value of p in the OTUCpTG being 2 represents that two OTUC frames are contained, which are respectively OTUC #9 and OTUC #10. Each OTUC frame is converted from one group of OTLC.m.

Step 2: after receiving the OTUC frames, the data receiving end could conduct, according to a trail trace identifier (TTI) in the OTUC frame or the serial number of the OTUCnAG represented by the first row and the 13$^{th}$ column in the OTUC frame, the following operations through a buffer after receiving all the OTUC frames having the same TTI or the same serial number of the OTUCnAG. In order to correspond to the OTUCnAG generated in embodiment IV, in the embodiment, after it is assumed that i+j+p (i+j+p=n) OTUC frames are received, the following byte-interleaving steps are executed according to the ascending order of the serial numbers carried in the first row and the 14$^{th}$ column of each OTUC frame. The serial number is filled in when the OTUC data is sent in embodiment IV and is used for identifying the serial number of the OTUC in the OTUCnAG. In the embodiment, the serial number of the OTUC increase from 1 to i+j+p, and the following execution process is described in the manner of C language:

```
for (k=1, k++, k < =4080)
{
    for (x=1, x++, x < =i+j+p)
    {
        the byte area content of four rows and the k$^{th}$ column of the OTUC #x frame
        composes the byte area content of four rows and the (n*(k-1) + x)$^{th}$ of the OTUCnAG
        frame.
    }
}
```

After the above-mentioned execution process is completed, a complete OTUCnAG frame is formed, and the data receiving end performs processing from the ODUCn frame in the OTUCnAG frame.

In summary, according to the embodiments of the disclosure, by way of dividing an OTUCnAG which is formed after an OTU overhead is added to an ODUCn having a rate of n*100 Gbit/s into a plurality of OTUCmTGs in a byte-interleaving way; and mapping each of the OTUCmTGs into a corresponding OCh respectively, and bearing data in the OCh on a continuous frequency slot band for transmission, the problem of how to map and multiplex data effectively after the flexible grid technology is introduced into the related art is solved, so that the operators can deploy a beyond 100 G optical transmit system more flexibility, thereby improving optical fibre spectrum utilization efficiency and system flexibility and compatibility.

Obviously, those skilled in the art should know that the above-mentioned components and steps of the disclosure can be realized by using a general purpose calculating device, and they can be integrated in one calculating device or distributed on a network which consists of a plurality of calculating devices. Alternatively, the components and the steps of the disclosure can be realized by using the executable program code of the calculating device, and consequently, they can be stored in the storing device and executed by the calculating device, or they are made into integrated circuit components respectively, or a plurality of components or steps thereof are made into one integrated circuit component. In this way, the disclosure is not restricted to any particular hardware and software combination.

The above description is only example embodiments of the present document and is not intended to limit the disclosure, and the disclosure can have a variety of changes and modifications for ordinary person skilled in the field. Any modification, equivalent replacement, or improvement made within the spirit and principle of the disclosure shall all fall within the protection scope as defined in the appended claims of the disclosure.

INDUSTRIAL APPLICABILITY

As stated above, the method and device for mapping and demapping data provided in the embodiments of the disclosure has the following beneficial effects: the operators can deploy a beyond 100 G optical transmit system more flexibility, thereby improving optical fibre spectrum utilization efficiency and system flexibility and compatibility.

What is claimed is:

1. A method for mapping data, comprising:
    dividing an Optical Transmit Unit 4 n Administrative Group frame (OTUCnAG) which is formed after an Optical Transmit Unit (OTU) overhead is added to an Optical Data Unit 4 n frame (ODUCn) having a rate of n*100 Gbit/s into a plurality of Optical Transmit Unit Transport Group Frames (OTUCmTGs) in a byte-interleaving way; and
    mapping each of the OTUCmTGs into a corresponding Optical Channel (OCh) respectively, and bearing data in the OCh on continuous frequency slots for transmission;
    wherein a rate of the OTUCnAG is n*100 Gbit/s, and a rate of the OTUCmTG is m*100 Gbit/s, with both m and n being positive integers, and m≤n.

2. The method according to claim 1, wherein dividing the OTUCnAG into the plurality of OTUCmTGs in the byte-interleaving way comprises:
    dividing the OTUCnAG having the rate of n*100 Gbit/s into n Optical Transmit Unit subframes (OTUCs) having a rate of 100 Gbit/s; and
    grouping the n OTUCs having the rate of 100 Gbit/s into L OTUCmTGs having the same or different rates,
    wherein the content in the [n*(k−1)+i]$^{th}$ column byte area of the OTUCnAG having the rate of n*100 Gbit/s is taken as the content in the k$^{th}$ column byte area of the i$^{th}$ of the OTUCs having the rate of 100 Gbit/s, and a frame structure of the OTUC has four rows and 4080 columns, with n, i, k and L being all positive integers, and n>L, 1≤i≤n, 1≤k≤4080.

3. The method according to claim 2, wherein an OTU overhead byte of each of the OTUCs carries at least one of the following: a serial number of the OTUC, and a serial number of the OTUCnAG to which the OTUC belongs.

4. The method according to claim 2, wherein mapping each of the OTUCmTGs into the corresponding OCh respectively comprises:
    distributing each of the OTUCmTGs on a plurality of electrical channel signals for transmission; and
    mapping the plurality of electrical channel signals corresponding to the same OTUCmTG into one of the OChs for transmission,
    wherein OChs corresponding to all of the OTUCmTGs in the same OTUCnAG belong to the same Optical Channel Administrative Group (OChAG).

5. A method for demapping data, comprising:
    after all of Optical Data Unit 4 n frames (OTUCs) having same Trail Trace Identifier (TTI) or same Optical Transmit Unit 4 n Administrative Group frame (OTUCnAG) serial number are received completely according to TTI or OTUCnAG serial number in Optical Transmit Unit (OTU) overhead bytes of the OTUCs, taking the content in the k$^{th}$ column byte area of each of the OTUCs as the content of the [n*(k−1)+x]$^{th}$ column byte area of the demapped OTUCnAG in an ascending order of the serial numbers of the OTUCnAGs to which the OTUCs belongs;
    where x is the serial number, in the OTUCnAG, of the OTUC, with x being an integer, and 1≤x≤n.

6. The method for demapping data according to claim 5, comprising:
    converting a received optical signal of each OCh in one of the OTUCnAGs into a plurality of groups of electrical channel signals respectively, wherein each group of the plurality of groups of electrical channel signals is converted into one of the OTUCs.

7. A sending node for sending an optical signal, comprising a hardware processor and a memory, and the hardware processor configured to execute program components stored on the memory, the program components comprising:
    a mapping component configured to divide an Optical Transmit Unit 4 n Administrative Group frame (OTUCnAG), which is formed after an Optical Transmit Unit (OTU) overhead is added to an Optical Data Unit 4 n frame (ODUCn) having a rate of n*100 Gbit/s, into a plurality of Optical Transmit Unit Transport Group frames (OTUCmTG) in a byte-interleaving way, wherein a rate of the OTUCnAG is n*100 Gbit/s, and a rate of the OTUCmTG is m*100 Gbit/s, with both m and n being positive integers, and m≤n; and
    a transmit component configured to map each of the OTUCmTGs into a corresponding Optical Channel (OCh) respectively, and bearing data in the OCh on continuous frequency slots for transmission.

8. The sending node according to claim 7, wherein the mapping component comprises:
    a division element configured to divide the OTUCnAG having the rate of n*100 Gbit/s into n Optical Transmit Unit subframes (OTUC) having a rate of 100 Gbit/s, wherein the content in the [n*(k−1)+i]$^{th}$ column byte area of the OTUCnAG having the rate of n*100 Gbit/s is taken as the content in the kth column byte area of the ith of the OTUCs having the rate of 100 Gbit/s, and a frame structure of the OTUC has four rows and 4080 columns, with n, i, k and L being all positive integers, and n>L, 1≤i≤n, 1≤k≤4080; and
    a packet element configured to group the n OTUCs having the rate of 100 Gbit/s into L OTUCmTGs having the same or different rates.

9. The sending node according to claim 7, wherein the transmit component comprises:

a multiplexing element configured to distribute each of the OTUCmTGs on a plurality of electrical channel signals for transmission, and map the plurality of electrical channel signals corresponding to the same OTUCmTG into one of the OChs for transmission, wherein OChs corresponding to all of the OTUCmTGs in the same OTUCnAG belong to the same Optical Channel Administrative Group (OChAG).

10. A receiving node for receiving an optical signal sent by a sending node, comprising a hardware processor and a memory, and the hardware processor configured to execute program components stored on memory, the program components comprising:

a demapping component configured to, after all of Optical Data Unit 4 n frames (OTUCs) having same TTI or same Optical Transmit Unit 4 n Administrative Group frame (OTUCnAG) serial number are received completely according to Trail Trace Identifier (TTI) or OTUCnAG serial number in Optical Transmit Unit (OTU) overhead bytes of the OTUCs, take the content in the $k^{th}$ column byte area of each of the OTUCs as the content of the $[n*(k-1)+x]^{th}$ column byte area of the demapped OTUCnAG in an ascending order of the serial numbers of the OTUCnAGs to which the OTUCs belongs, where x is the serial number of the OTUC in the OTUCnAG, with x being an integer, and $1 \leq x \leq n$.

11. The receiving node for receiving the optical signal sent by the sending node according to claim 10, the program components further comprising:

a demultiplexing component configured to convert a received optical signal of each OCh in one of the OTUCnAGs into a plurality of groups of electrical channel signals respectively, wherein each group of the plurality of groups of electrical channel signals is converted into one of the OTUCs.

* * * * *